United States Patent
Vaneecke et al.

(10) Patent No.: US 9,254,527 B2
(45) Date of Patent: Feb. 9, 2016

(54) METHOD TO PRODUCE A SAWING BEAD

(75) Inventors: Jan Vaneecke, Gits (BE); Roland Groenen, Horebeke (BE); Tom Baekelandt, Dadizele (BE)

(73) Assignee: NV BEKAERT SA, Zwevegem (BE)

( * ) Notice: Subject to any disclaimer, the term of this patent is extended or adjusted under 35 U.S.C. 154(b) by 65 days.

(21) Appl. No.: 14/001,817

(22) PCT Filed: Mar. 2, 2012

(86) PCT No.: PCT/EP2012/053643
§ 371 (c)(1),
(2), (4) Date: Aug. 27, 2013

(87) PCT Pub. No.: WO2012/119947
PCT Pub. Date: Sep. 13, 2012

(65) Prior Publication Data
US 2013/0333681 A1    Dec. 19, 2013

(30) Foreign Application Priority Data

Mar. 4, 2011    (EP) ..................................... 11156982

(51) Int. Cl.
*B23D 61/18*    (2006.01)
*B23D 65/00*    (2006.01)
(Continued)

(52) U.S. Cl.
CPC ............... *B23D 61/18* (2013.01); *B23D 61/185* (2013.01); *B23D 65/00* (2013.01); *B28D 1/08* (2013.01); *B28D 1/124* (2013.01)

(58) Field of Classification Search
CPC ...... B23D 61/18; B23D 61/185; B23D 65/00; B28D 1/08
USPC ......... 125/12, 21; 219/76.1, 76.11, 76.14, 77; 264/125, 259, 271.1, 279, 279.1
See application file for complete search history.

(56) References Cited

U.S. PATENT DOCUMENTS 2,679,839 A    6/1954    Metzger
2,773,495 A    12/1956    Lefevre
(Continued)

FOREIGN PATENT DOCUMENTS

DE    195 20 149 A1    12/1996
EP    0 256 619 A2    2/1988
(Continued)

OTHER PUBLICATIONS

Konstanty, J., "Powder Metallurgy Diamond Tools", *Elsevier Science*, Chapter 5, Microstructure of the Matrix, pp. 88-103, (2005).
(Continued)

*Primary Examiner* — Timothy V Eley
(74) *Attorney, Agent, or Firm* — Foley & Lardner LLP (57) ABSTRACT

A method is described for producing a sawing bead for use in a sawing cord. Sawing cords are used for cutting hard and brittle materials. In the method, laser cladding is used to form an abrasive layer on a small metallic tube (204) or sleeve. The abrasive layer (220) comprises a metal matrix material in which abrasive particles such as diamond, cubic boron nitride or other hard cutting materials are embedded. The metal matrix material preferably comprises an active metal that improves wetting and adhesion of the abrasive particles. Although the abrasive particles are relative large—with a particle size in excess of 100 μm—they are evenly distributed throughout the abrasive layer. This is achieved by letting the tube (204) rotate relative to the laser cladding system possibly in combination with a relative axial movement so that the cladding track loops on itself thereby forming an abrasive layer (220). Additionally the method allows to shape the sawing bead for improved geometrical tolerances and centricity. Production times are less than ten seconds per bead and the method is easily automated.

18 Claims, 7 Drawing Sheets

(51) Int. Cl.
  *B28D 1/12* (2006.01)
  *B28D 1/08* (2006.01)

(56) References Cited

U.S. PATENT DOCUMENTS

| | | | |
|---|---|---|---|
| 3,598,101 | A | 8/1971 | Hensley |
| 3,983,357 | A * | 9/1976 | Whitney et al. ............... 219/615 |
| 6,146,476 | A * | 11/2000 | Boyer ............................ 148/525 |
| 6,316,744 | B1 | 11/2001 | Nowotny et al. |
| 7,089,925 | B1 * | 8/2006 | Lin et al. ........................ 125/21 |
| 7,827,883 | B1 * | 11/2010 | Cherng et al. ............... 76/107.8 |
| 8,807,126 | B2 * | 8/2014 | Baekelandt et al. ............ 125/21 |
| 2007/0194492 | A1 | 8/2007 | Floratti |
| 2014/0000579 | A1 * | 1/2014 | Vaneecke et al. ............... 125/21 |
| 2014/0374954 | A1 * | 12/2014 | Ghillebert et al. ......... 264/279.1 |

FOREIGN PATENT DOCUMENTS

| | | |
|---|---|---|
| FR | 1.203.000 | 7/1959 |
| FR | 1.265.542 | 5/1961 |
| GB | 759505 | 10/1956 |
| WO | WO 98/15672 A1 | 4/1998 |
| WO | WO 99/18260 A1 | 4/1999 |
| WO | WO 02/06553 A2 | 1/2002 |
| WO | WO 02/40207 A1 | 5/2002 |

OTHER PUBLICATIONS

Lang, A. et al., "Herstellung diamanthaltiger, endkonturnaher Metallmatrix-Verbundwerkstoffe durch Laserstrahlbeschichten", *Material-Wissenschaften und Werkstofftechnologie*, vol. 27, pp. 215-226, (1996).

Toyserkani, E. et al., "Laser Cladding", *Physical Mecallurgy and Material Systems of Laser Cladding*, Chapter 6, pp. 178-225, (2005).

Bortolussi, A. et al., "Progress in the knowledge of granite cutting with diamond wire", *Proceedings of the 11$^{th}$ International conference on Ground Control in Mining*, University of Wollongong, pp. 1-7, (1992).

* cited by examiner

METHOD TO PRODUCE A SAWING BEAD

TECHNICAL FIELD

The invention relates to a bead for use on a sawing cord. Such sawing cords are used to cut hard and brittle materials like natural stone (marble, granite, rock, . . . ), artificial stone (concrete, brickwork, . . . ), composite materials or crystalline materials (mono- or polycrystalline silicon).

BACKGROUND ART

Beads having an outer abrasive layer of a metal matrix in which diamond grit is embedded appear to be first described in the beginning of the fifties of the previous century (see e.g. U.S. Pat. No. 2,679,839, filed 1952). Such beads are strung onto a steel cord and are separated by means of springs (see U.S. Pat. No. 2,679,839) or by means of a plastic material (see e.g. FR 1.203.000, filed 1958). The plastic material could also be injected between the beads by the aid of a mould (FR 1.203.000, first addition, filed 1959). The ideas of fixing the wire directly to the steel cord e.g. by means of a pin (GB 759,505, filed 1953), by means of soldering (FR 1,265,542, first filed 1960) or by means of swaging (U.S. Pat. No. 3,598,101, first filed 1968) were also explored.

Initially, these sawing cords where used on stationary saws, where they competed with gang saws (reciprocally driven frames with parallel mounted steel lamella on which diamond containing bits are mounted) and circular disc saws. The sawing cord was made in a closed loop by splicing the steel cord as e.g. described in U.S. Pat. No. 2,773,495, filed 1953). After tensioning the loop over two large wheels driven by a motor, the cord could be used as a saw. Current state of the art machines are available wherein up to 80 loops are driven parallel to one another to separate a block of stone into a series of slabs. In an alternative use, such diamond bead sawing cords started to appear in quarries at the beginning of the seventies of the previous century where they were used for block extraction.

A number of methods have been explored by which the abrasive material—mostly diamond—can be fixed onto the beads. There is the method of affixing the diamonds to a metallic tube by means of electrolytic or electroless deposition of nickel (WO 2002/40207). There is also the method of embedding the abrasive particles into a braze that is directly applied on the metal sleeve as described in U.S. Pat. No. 7,089,925.

The method that has become the most successful is via the route of powder metallurgy (described already in U.S. Pat. No. 2,679,839). To this end an annular abrasive element is made from diamond grit that is thoroughly mixed with metal powder and an optional organic wax for forming a paste. The mixture of metal powder normally contains high melting temperature components such as cobalt, tungsten, iron, nickel sometimes in combination with low melting temperature components such as copper, tin, silver to improve consolidation. Possibly compounds such as tungsten carbide can be added to influence hardness and wear of the bead. The mixture is brought in a mould. This preform is sintered into a high density bead by application of pressure (by ram pressing in the mould or by applying isostatic pressure through immersion in a high pressurised fluid) and temperature. Suitable gasses are applied in order to prevent the powder from oxidising during sintering.

In the sintering process the annular abrasive element is heated to a high temperature followed by a slow cooling i.e. in a quasi thermal equilibrium. Even if not all components of the alloy get the chance to melt, the addition of melting point lowering components will lead to intermetallic phases between the different components through diffusion. The metallographic cross section of such annular abrasive element shows therefore a globular and/or granular structure. In the classical bead sintering process it is generally preferred that grain sizes should be small in order to obtain sufficient matrix material hardness. This grain size can be affected by varying the properties of the starting powders and the conditions for their consolidation. In any case grains remain visible in a properly etched metallographic cross section and no directional growth effects are visible. See e.g. "Powder Metallurgy Diamond Tools" by Janusz Konstanty, Chapter 5, 2005, Elsevier Science Title, ISBN 978-1-85617-440-4.

The selection of metals, amount and type of diamonds, and pressure-temperature trajectory is internal know-how of the producers that greatly influence the quality of the final product.

After sintering the annular abrasive element is fixed to a metallic sleeve slightly longer than the abrasive element by means of a braze. The combination of the metallic sleeve with the abrasive element is called a bead. The need for a metallic tube to fix the abrasive element on can be eliminated by forming the abrasive element sufficiently precise as described in US 2007/0194492 A1.

Sintered beads have become the technological leader because:
  they have a sufficiently thick abrasive layer
  wherein the diamonds are randomly embedded throughout the layer,
  the matrix material wears at the same pace as the diamonds are used up
  while the matrix material retains the diamonds well and
  because the beads can be reproducibly made with narrow geometrical tolerances.

Thereafter the beads are threaded onto a steel filament carrier cord ('steel cord') and subsequently fixed by springs or a plastic. This 'threading step' is tedious and time consuming. As the surface of the beads is smooth due to the pressing in a mould, the beads must be 'dressed' before being used. This is usually done by using the sawing cord initially at low cutting speed till the abrasive particles are freed from the surface and cut better. Such 'dressing step' is time consuming.

Another method for producing abrasive layers is currently making its inroads into the world of saw blades for cutting stone namely laser cladding. In laser cladding a stream of powder is fed into a high-intensity beam of a laser that is focussed on the surface of the substrate by means of a carrier gas stream. The powder is a mixture of metal powder and abrasive particles (usually diamond). The powder melts and forms a pool of molten metal that solidifies and fixes the abrasive particles.

DE 195 20 149 A1 discloses a process for laser-cladding a substrate whereby by means of a cooled (or heated) mould a near final finish of an abrasive or wear resistant surface can be formed. The cladding is applied onto the mould after which the mould is removed. The application only discusses the deposition on relatively bulky substrates such as a saw blade. The cladding is performed in one single layer.

WO 1999/18260 (EP 1027476) describes a cutting tool built on a steel substrate with an abrasive coating comprising abrasive material embedded in a wetting agent containing metal or metal alloy matrix where between the abrasive coating and the steel substrate a non-ferrous layer is present that is substantially free of wetting agent. Although the abstract mentions a saw cable as an example of a cutting tool, this is not further exemplified in the description.

In laser cladding, the low density of diamond relative to that of a molten metal makes the diamonds float upward in the metal pool which leads to a non-homogenous distribution of the diamonds (see FIG. 16 of "Herstellung diamanthaltiger, endkonturnaher, Metallmatrix-Verbundwerkstoffe durch Laserstrahlbeschichten" by A. Lang and H. W. Bergmann in "Material-Wissenschaften and Werkstofftechnologie", Vol. 27 pp. 215-226, 1996). One solution is to use finer abrasive particles where the up-floating is slowed by the viscosity of the metal pool. But for many technological applications—notably stone cutting—fine diamond particles are not an option.

Another solution is described in WO 1998/15672 where a particular arrangement of vertical substrate surface movement with a laser cladding tool in horizontal direction leads to an upwards rising of the diamond particles in the direction of the deposited layer. Again the deposition is in one layer.

WO 02/06553 discloses a method for making sawing beads according the laser cladding method. No details are given on the metallographic structure resulting from the method, nor of the materials used. Considerable pre- and post-processing of the resulting carrying tube is necessary in order to obtain the sawing bead.

Although the described methods for making a cutting tool by means of laser cladding sometimes suggest it to be suitable for making beads for sawing cords, this turned out not to be straightforward at all as the inventors experienced. All patents describe the deposition of a laser clad abrasive layer on a massive low carbon steel substrate (such as a sawing disc or tube). In those cases a large heat sink is available to drain off the excess heat.

The inventors faced and solved four major problems

One problem is to drain the heat sufficiently fast from the tiny metal sleeve of less than one gram (!), such that it does not deform or, total disaster, completely melts. On the other hand sufficient heat must be supplied in order to be able to obtain a strong bond to the sleeve and to form a dense abrasive layer. This is called the 'heating problem';

The 'geometry problem' whereby it turned out to be difficult to produce the beads consistently within geometrical tolerances and with sufficient roundness and centricity. This problem is particularly important as during use the sawing cord must rotate in order to ensure a uniform wear of the abrasive layer.

The 'particle distribution problem' whereby it turned out to be difficult to have a uniform distribution of abrasive particles in the abrasive coating. This is important as during use the matrix material gradually abrades away unveiling radial lower laying diamonds in the layer. If all diamonds are e.g. on the surface, they will wear first and no lower laying diamonds are available.

The dressing problem, which is the problem that abrasive particles are buried under a layer of matrix material and are not active from first use onward.

DISCLOSURE OF INVENTION

The object of the invention is therefore to overcome the problems faced when applying the 'laser cladding technique' for making sawing beads for a sawing cord. More specifically the objects of the invention are to provide a solution to the 'heating problem', the 'geometry problem', the 'particle distribution problem' and the 'dressing problem' either separately or in combination. Another object of the invention was to keep the number of processing steps as low as possible in order to reduce the overall cost of the process of making beads. A further object of the invention was to eliminate the need for a 'bead threading step' in the production of a sawing cord i.e. to be able to make a bead 'in situ' on the steel cord. Production Method and Hardware Selection Section.

The method will be clarified with references to FIGS. 1 to 3 and 10. The hundred digit refers to the number of the figure where a feature is first introduced.

Figure 2A:
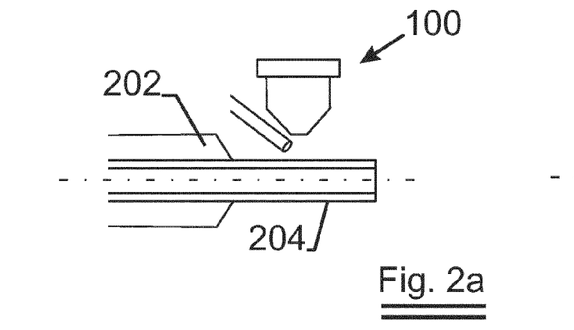
FIG. 2a to FIG. 2e shows the various steps in the method to produce the bead.

According a first aspect of the invention a production method for a bead is described. The method starts from a metallic tube 204 having an outer diameter OD. In its most extreme case, the tube can be a rod but this is less preferred as this brings an additional step of having to drill out a centre hole after the bead has been produced. Therefore the metallic tube preferably has an inner diameter ID, slightly larger than the diameter of the steel cord. In what follows 'a sleeve' is a tube that is shorter than say ten times the outer diameter of the tube. Hence 'a sleeve' is a particular kind of 'tube'. The size of current sawing cords is standardised. At present the following types for the carrying sleeve of the bead are most preferred:

Inner diameter 5 mm, outer diameter 7 mm (i.e. the wall thickness is 1 mm), length 11 mm with a total mass of 1.6 grams. Inclusive the abrasive layer the bead has an overall diameter of about 9 to 11 mm. This is for use with a steel cord of diameter 4.95 mm. This size is particularly preferred for block extraction in quarries.

Inner diameter 3.7 mm, outer diameter of 5.0 mm (i.e. wall thickness 0.65 mm), length of 11 mm with a total mass of 0.77 grams. This size is particularly preferred for slabbing machines. The total outer diameter of the bead is about 7.2 mm (5.7 mm at end-of-use). The steel cord used has a diameter of 3.5 to 3.6 mm.

For the future, sleeves with even smaller diameter such as for example an inner diameter of about 3.0, or even lower than 2.5 mm, an outer diameter of at the most 4.0 mm with wall thicknesses of less than 0.5 mm, a length of about 11 mm or lower, with a weight of less than 0.5 gram and an overall diameter of less than 7.0 mm are considered. The steel cord will have a diameter of less than 2.9.

In each case about 1 to 3 grams, sometimes 1 to 2 grams of abrasive layer needs to be present on the sleeve. Of course, the more stock of abrasive layer is present, the longer the useful life of the bead. The above mentioned sizes and masses are indicative. The trend towards finer overall diameters is there. This brings with it that sleeves will become more minute and hence the starting tube will have a smaller OD and wall thickness.

The mass of the abrasive material on the tube is, after application of the method, higher than the mass of the tube or rod covered by the abrasive layer. Or even more severe: the tube wall thickness is smaller than the thickness of the abrasive layer. It is the merit of the inventors to have found how such thick coating can be deposited on such minute substrate.

The tube is held at one or both ends by means of a lathe claw or drill chuck or similar clamp 202. The tube is by preference rotatably mounted and optionally the tube can be shifted axially over at least the length of the abrasive layer (5 to 15 mm).

Figure 1:
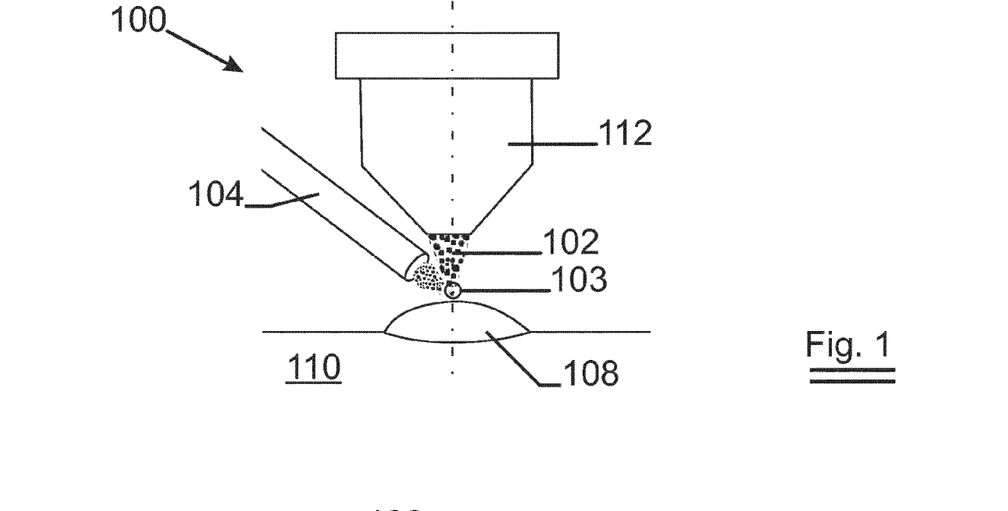
FIG. 1 shows a principle of operation of a laser cladding system.

In the method use is made of a laser cladding system 100 equipped with:

A high intensity laser capable of delivering beams of at least 100 W, 1 kW or more of continuous or pulsed power, by preference emitting in the infra-red region of the spectrum. Particularly suited are Nd:YAG (neodymium doped yttrium-aluminium garnet) lasers pumped by flash lamps or solid state lasers or $CO_2$ gas lasers. The laser-light is guided through suitable wave guides and optics 112 to have a focal point 103 that can be adjusted in the vicinity of the substrate surface;

a supply of metal matrix material 104, in the form of a powder, or a wire or a ribbon that is fed into the focal point of the laser. The powder can e.g. be supplied in a carrier gas, preferably a non-oxidising gas or inert gas such as argon;

a supply of abrasive particles 102. These particles are by preference carried by a stream of carrier gas. Preferably the type of gas for carrying the abrasive particles and for carrying the metal matrix material is the same. Alternatively and also preferred is that the supply of abrasive particles 102 can simply be done by strewing.

By preference, each one of the supplies of metal matrix powder 104, of the abrasive particles 102 or of the heat input by means of the laser can be modulated in time independently and can occur through separate feed channels. The supply of metal matrix powder 104 and abrasive particles 102 can be combined in a single feed channel although this is not a necessity.

A particularly preferred procedure is where the supply of metal matrix material and the supply of abrasive particles are such that the average thickness of the track formed is between 0.1 and 5 times or between 0.5 and 3 times or between 1 and 3 times the mean size of the abrasive particles. With 'average thickness' is meant the arithmetical average of at least 12 measurements in radial direction at regular angular intervals excluding radii that cross abrasive particles. The needed mass flow for each of the respective supply of abrasive particles and metal matrix material can be calculated from the densities of both constituents.

Preferably the stream of carrier gas is directed by means of a laser gun such as described in U.S. Pat. No. 6,316,744 wherein the gas flow is coaxial to the laser beam and converges towards the focal point through a conical annular nozzle. Such a laser gun is also cooled by water in order to prevent heating of the nozzle. The metal matrix material can be fed through the laser gun, while the abrasive is delivered through a separate gas flow or simply by strewing. Alternatively, the metal matrix material can be delivered through a nozzle separate from the laser gun while the abrasive particles are fed through the laser gun. Or both abrasive particles and metal matrix material can be supplied through the laser gun. Preferred is that abrasive particle supply and metal matrix material supply are separate as they do have quite distinct powder—and hence flow—properties.

The light path of the laser is adjusted so that the focal point 103 is in the vicinity of the tube surface 110. A particularly preferred embodiment of the method is when the focal point 103 is formed slightly (3 to 10 mm) above the surface of the metallic substrate tube. In this way the matrix material is heated-up prior to impinging on the surface of the tube. The heated metal matrix material then sticks better to the metallic tube 204.

In this way a pool of molten metal 108 forms on the substrate tube. At the same time—or slightly thereafter—abrasive particles are thrown into the molten metal pool by the supply of abrasive particles 102 carried by the carrier gas or by gravitationally assisted strewing of the particles.

Even before the laser cladding system is ignited, the metallic tube is made to rotate around its axis. Alternatively, the laser gun can be rotated around the stationary metallic tube axis. Or both the tube and the laser gun can rotate relative to one another. Of course the first alternative is most preferred as this is the least complex. A relative rotational movement 209 between metallic tube and the laser cladding system is thus established.

Figure 2B:
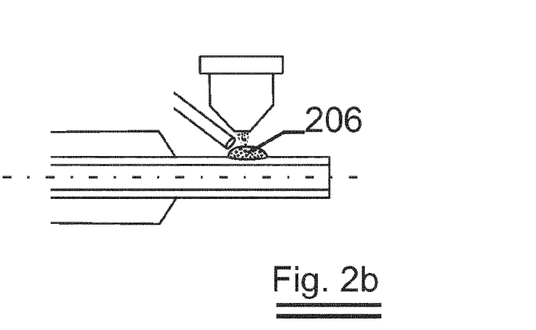
Figure 10A:
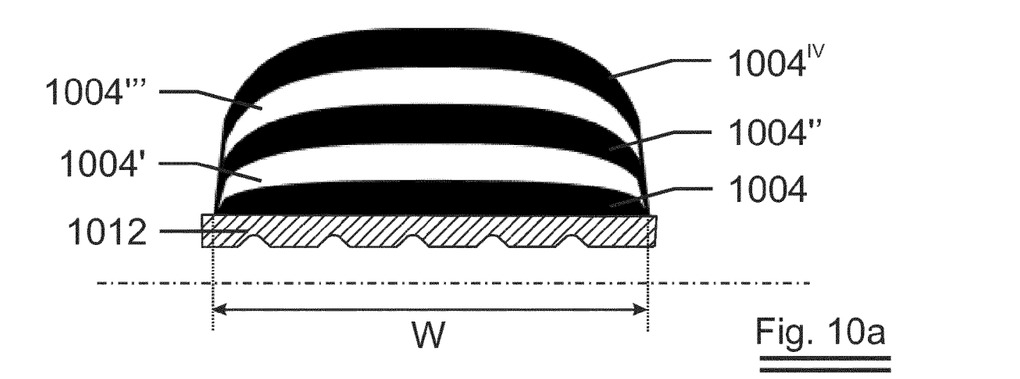
FIGS. 10a, 10b and 10c show different arrangements of the layers in the bead.

As soon as the laser cladding system is started a track 206 of solidified matrix metal material forms on the tube. A slight delay between the ignition of the laser and the arrival of abrasive particles allows the molten metal pool to establish before the first abrasive particles are thrown into it. If the laser gun is not moved axially relative to the metallic tube, a track will build that loops on itself. Material will—after one turn—be deposited on already solidified material. This is particularly preferred if the nozzle of the laser gun delivers a sufficiently wide track i.e. the width 'W' of the track is about the length of the bead. Profiles of laser clad tracks show a generally elliptical to rectangular distribution so their width can readily be established. The width of the track relates to the size of the laser spot perpendicular to the direction of relative movement. FIG. 10*a* shows a cross section of a bead with a sleeve 1012 and with a single track spirally wound on itself resulting in subsequent layers 1004, 1004', . . . 1004$^{IV}$ clad on top of one another.

Figure 2C:
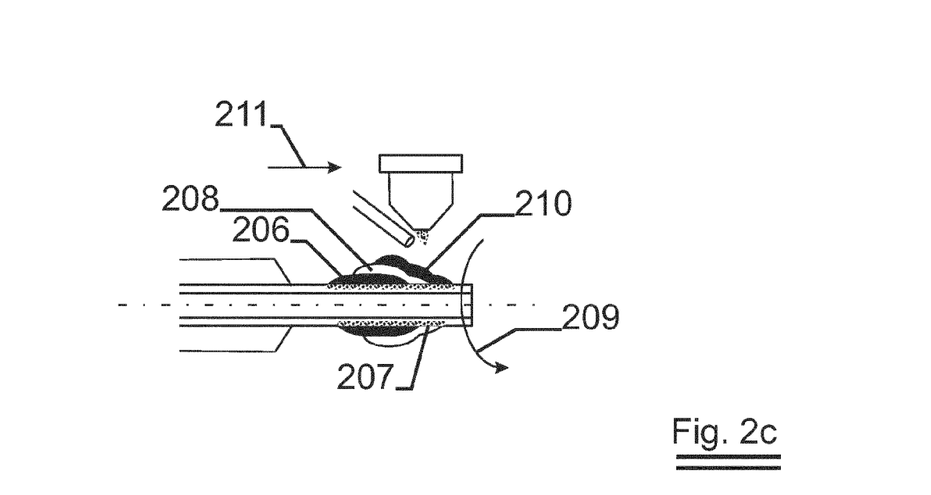
Figure 10B:
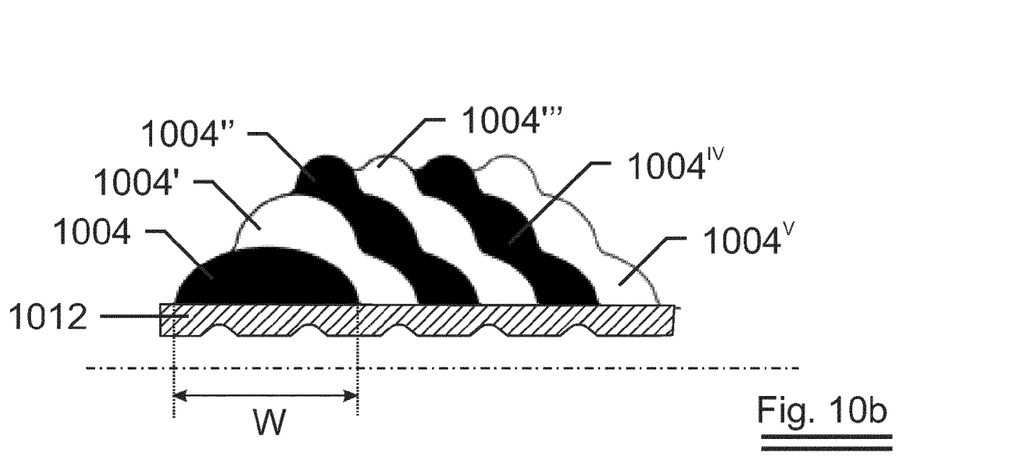

If the nozzle of the laser gun does not cover the width needed for the bead, introducing a relative axial movement 211 is an option. By preference the axial displacement after one full rotation—the pitch—is equal to or less than the width 'W' of the track. Preferably, the pitch is a fraction of the width 'W' for example W/2, W/3, . . . or in general W/Q (Q is a positive rational number). Hence the abrasive layer will be formed by at least 'Q' layers of which the first one 206 is in contact with the metallic tube over the whole layer, while the layers following 208, 210, 212, 214, 216 . . . will only have at most 1/Q of their track width in contact with the metallic substrate while the remaining part (Q−1)/Q is on top of an already formed track (the 'overlap'). Increasing the overlap has beneficial effects for the abrasive particle distribution in the abrasive layer (the 'particle distribution problem'). FIG. 10*b* shows a schematic cross section of such a bead with tracks 1004, 1004', . . . , 1004$^V$ axially shifted over W/3 or Q is 3.

Figure 10C:
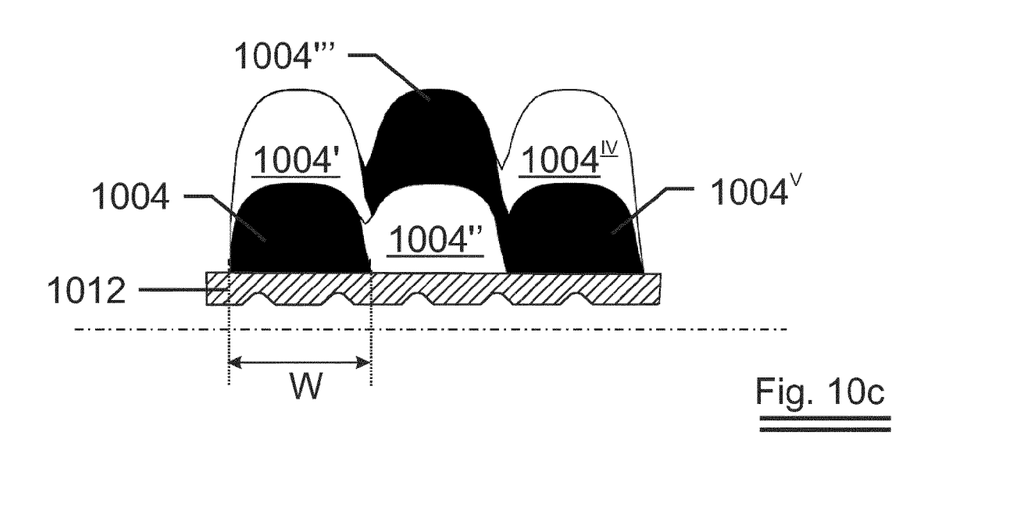

Another method procedure is when the optional translational movement is performed in a stepwise motion. First the track is clad over a few turns of the tube without relative axial motion until sufficient material is build on the starting section of the bead. Then the laser gun is axially moved over a number of intervals each of said intervals covering a predefined length at a predefined speed. Finally the movement of the laser gun is stopped again and some overlapping turns are made at the end of the bead. In this way the mass of abrasive layer can be spread at will over the length of the bead. An example of this is shown in FIG. 10*c*, wherein the different tracks are shifted a track width W from one another. Two layers (e.g. 1004, 1004') are deposited on top of one another.

Preferably the time to form the abrasive layer is limited to less than about 10 seconds, or less than 5 seconds or even less than 3 seconds. However, it will take at least 0.5 second to make a single abrasive layer of the dimensions currently in use. The relative rotation speed of the tube should be such that at least a circumferential tube speed '$v_t$' of 5 mm/second is reached. This corresponds to one turn in about 4 seconds on a 6 mm outer diameter tube. More preferred is though that the rotational speed is higher e.g. 1 turn in 2 seconds, or more than 2, 3, 4, 5 . . . turns in 2 seconds of laser cladding time. This corresponds to circumferential tube speeds of at least 9, 18, 28, 37, . . . mm/second. Increasing the number of turns per second has a beneficial effect on the thermal loading of the tube. On the other hand the circumferential tube speed cannot be too high as then the molten metal pool that forms is spun off from the sleeve due to centrifugal forces. This occurs when circumferential speeds in excess of 500 mm/second are applied on a 6 mm OD sleeve. For smaller sleeves this circumferential speed needs to be lower to prevent spin-off. For example on a 4 mm OD sleeve '$v_t$' must remain below 410 mm/second.

Figure 2D:
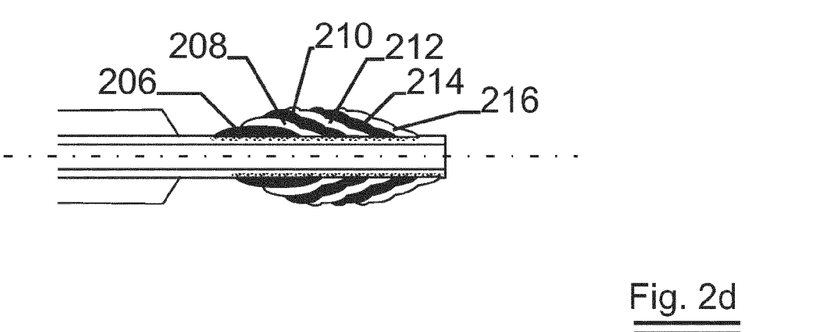

After the bead is formed i.e. when a thickness of about 1 to 3 mm over the total axial length of about 3 to 15 mm of the abrasive layer is reached the cladding of the tube is stopped and the thus formed bead is allowed to cool down (FIG. 2d).

In an alternative embodiment, stopping of the cladding of the tube is performed in steps, namely first stopping the supply of abrasive particles while continuing the flow of metal matrix material for at least one rotation of the tube before letting the bead cool down. As an option the laser beam can be 'on' or 'off' during this at least one rotation of the tube. In either situation (laser beam 'off' or 'on') a final cover is put down on the abrasive particles to attach them better. When the laser beam is 'off' the still hot bead is cooled down faster. The resulting bead shows abrasive particles that are protruding from the surface of the bead but are held with a minute layer of metal matrix material for retaining the particles. Such a bead has the particular advantage that there is no need for the 'dressing' of the bead thereby solving the 'dressing problem'.

Figure 3A:
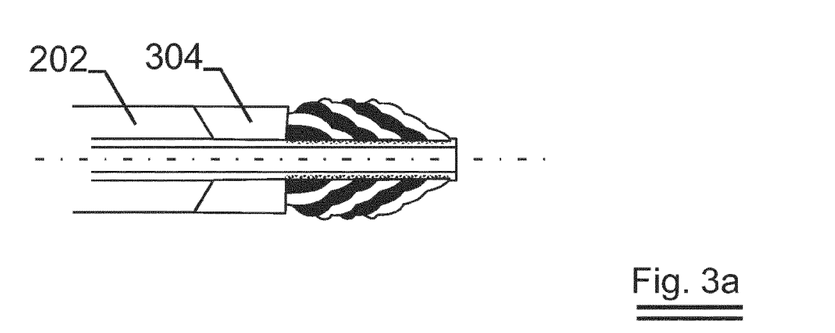
FIG. 3a to FIG. 3d show various alternative embodiments of the method to produce the bead.

In order to overcome the 'geometry problem', the inventors put at one side a forming piece 304 over the end of the tube thereby forming a rectangular circumferential corner against which the abrasive layer was built. After taking away the forming piece, a nice sharp edge of the bead can be obtained. When putting such a forming piece 304, 306 on both ends of the tube, both ends of the abrasive layer of the bead are flat. Those forming pieces 304, 306 are present during the forming of the abrasive layer.

The forming pieces 304, 306 can be in the form of a ring, or more preferred a segmented ring (with two or more segments) that can be opened to a diameter of at least the diameter of the finished bead and upon closing tightly fits the tube. The forming pieces can be shaped e.g. to impose one or more protrusions or one or more recesses at one or both sides of the abrasive layer.

In addition or alternatively to the forming pieces 304, 306 at one or both ends, after the stopping of the laser cladding, but prior to the complete cool-down of the bead, the still soft bead can be shaped by calibrating it in a mould. Such a mould can take the form of two halves that give the final shape to the bead after being closed. Possibly the tube can be rotated while the bead is held in the mould in order to improve rotational symmetry of the bead.

Figure 3B:
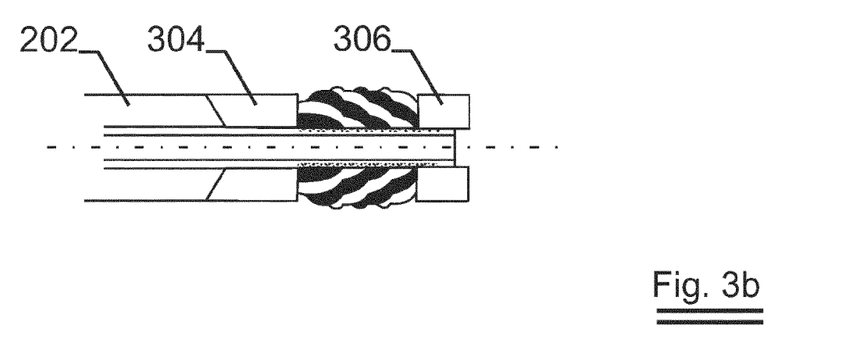

In addition or alternatively to providing forming pieces 304, 306 at one or both ends of the tube, the bead can also be shaped by pushing a rotational mould 308 e.g. a roll against the bead after the stopping of said laser cladding but prior to the complete cool-down of the bead. The rotational mould 308 must be held against the bead and rolled over it for at least one whole perimeter of the bead.

Figure 3C:
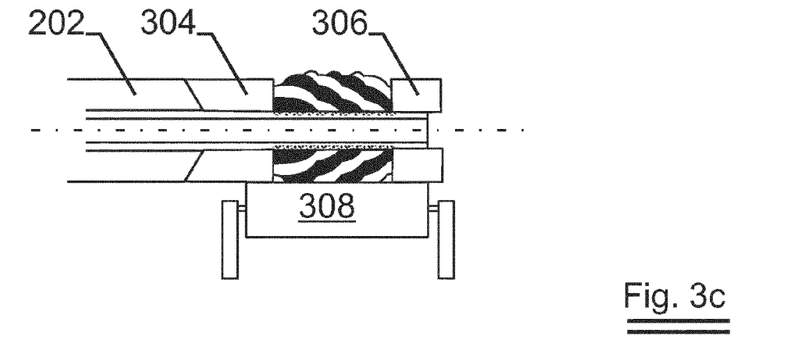
Figure 3D:
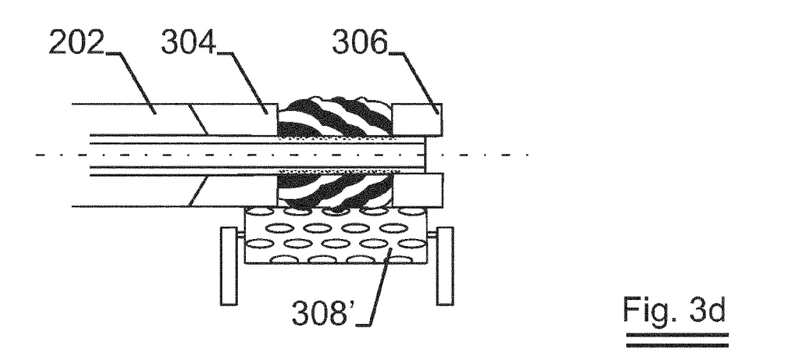

By providing the rotational mould 308' and/or said forming pieces 304, 306 with a structured pattern, the negative of this pattern can be brought over to the sides (in case the forming pieces are shaped) or outer surface (in case of a shaped rotative mould 308') of the abrasive layer of the bead.

Sticking of the rings and/or the mould is a problem that occurs. In order to prevent this, the inventors found that it is better to make the mould parts in shiny metal material such as e.g. polished brass or other copper based alloy (copper beryllium). The high reflectance of these parts prevents that they are being heated up by the laser beam.

Figure 2E:
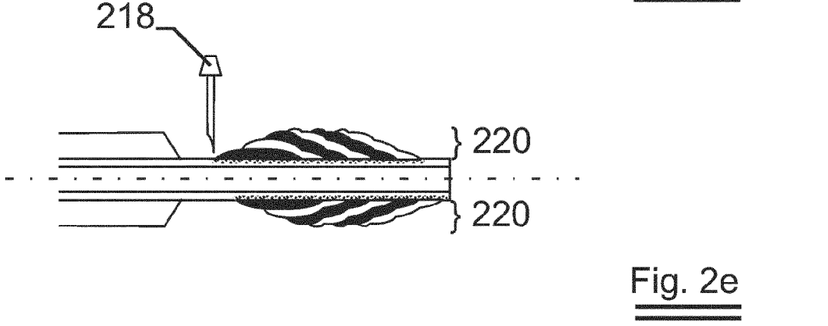

In a further preferred embodiment of the method the substrate tube is held at one end e.g. by a lathe chuck 202, the abrasive coating 220 is laser clad on the tube 204 according to any of the methods described above. The thus formed bead is cut off by means of a chisel or a saw 218. The tube 204 is progressed axially through the lathe chuck 202 under the laser cladding apparatus and the cycle is repeated. In this way beads can be made that further can be threaded on a steel cord in the known way.

Alternatively the lathe chuck 202 can take the role of a forming piece 304. Then the laser cladding starts against the lathe chuck and after the bead is formed the tube is progressed over at least the length of the bead. Then the bead is cut off by means of a chisel or a saw. A fresh piece of tube is already present to start a new cycle. Optionally a second forming piece 306 can be closed around the free end of the tube in order to form both sides of the bead. After finishing the bead, the forming piece 306 must open preferably sufficiently in order to allow the bead to pass.

Alternatively, a series of abrasive layers can be deposited on the tube, gradually stepping the tube further each time the width of an abrasive layer is coated. Afterwards the tube can be cut into individual beads.

It turns out to be very beneficial to cool down the tube in order to prevent excessive heat load on the tube. This can be done in a number of ways:

A fluid can be driven through the tube while it rotates. A fluid can be a gas or a liquid. Examples are nitrogen or water. The flow rate can be adjusted. Gases have the advantage that they do not have to be collected, but they need a larger flow rate than liquids.

A solid can be moved through the tube that absorbs some of the heat.

A particularly convenient way to execute the cooling is by moving the steel cord—that later will function as the carrier cord for the beads—through the tube. In this way the beads are produced while being on the cord thus eliminating the step of having to thread the beads on the steel cord afterwards. The steel cord can also be moved backward and forward so that the temperature of the steel cord does not rise too much. The lower the temperature of the steel cord remains the better: the heat transfer is improved (larger temperature difference is beneficial for cooling) and damage to the cord is minimised.

The tubes can be pressed and connected around the steel cord in a previous step as described in application PCT/EP2010/067527 (in particular paragraphs [0016] to [0018]) prior to coating them by laser cladding.

Although laser cladding with metal matrices containing abrasive particles is known, these methods are only exercised on bulky metal substrates such as drill bores, saw blades, grinding blades, tubes and the like. It appears a prejudice in the field that such bulky substrates are needed in order to be able to drain the process heat from the coating in the laser cladding process. As the mass of the tubular sleeve is very small the cooling rate 'dT/dt' together with the circumferential speed '$v_t$' will determine whether the sleeve will survive the coating process or not. In contrast therewith a sufficient amount of heat is needed in order to form a metallurgical bonding layer 207 between the sleeve and the abrasive layers 206 and to consolidate the subsequent layers 208, 210 . . . to one another. These requirements are contradictory but reconciled by the above disclosed method thereby solving the 'heating problem'. The inventors remarkably found that the disclosed coating method can be used for the production of sawing beads, wherein the mass of the abrasive layer is larger than the mass of the metallic tube or rod covered by said abrasive layer. Only the mass of tube radial under the abrasive layer must be considered. The mass of the tube covered may be less than 1 gram.

Or even more severe: that the metallic tube wall thickness is less than the thickness of the abrasive layer. Of course the thickness of the unused bead is to be considered as—during use—most of the abrasive layer will abrade away.

Materials Selection Section.

By preference the metallic tube that is used as a substrate is made of a metal or metal alloy having a higher melting point than that of the metal matrix material. Particularly liked metals are plain carbon steels or stainless steel. Preferred is a low to medium carbon steel i.e. steel with carbon content between 0.04 wt % and 0.80 wt % weight percent of carbon. The substrate can be supplied in the form of a long tube. Or the substrate can be supplied in the form of short sleeves that have been formed and connected around the carrier steel cord as described in application PCT/EP2010/067527 of the applicant (more in particular paragraphs to [0018]). The sleeves then show a connection. The wall thickness of the metallic tube is less than 1 mm, even thinner than 0.7 mm while successful tests have been performed by the inventors on sleeves, with a wall thickness of 0.3 mm. The inventors believe that a wall thickness of 0.2 mm or even 0.1 mm is doable. Sleeves are preferably provided with an internal grooving such as a threading to provide better grip with the polymer covering the steel cord. 'Wall thickness' of the sleeves is therefore understood to include the internal peaks of the threading. Additionally the sleeve may have a varying wall thickness—for example thinnest at the ends, thickest in the middle—for better penetration of the polymer.

There are many known alloys of metal matrix materials that are suitable for use with a laser cladding system. Given the constraints imposed by the abrasive particles alloys with melting temperatures between 400° C. and 900° C. are more preferred. These alloys comprise silver, copper, nickel or cobalt as main alloy element. Additionally, melting temperature reducing elements such as tin, zinc, or even indium can be added. In the case of nickel non-metals like phosphorous, silicon or boron can be used to reduce the melting temperature.

Particularly preferred are brazes (copper and zinc as main elements) and bronzes (copper and tin as main elements) the latter being most preferred. Other preferred alloys are silver based such Ag—Cu, Ag—Cu—Zn, or Ag—Cu—In. Also preferred alloys are nickel based such as Ni—Cr—P, Ni—Cr—Fe—Si—B, or Ni—Cr—Si—Mn. These alloys give a good balance between abrasive use and matrix wear. If the matrix wears too fast, abrasive particles will be dislodged while not being used to the full leading to premature tool wear. Conversely, if the matrix is too wear resistant, abrasive particles will not protrude sufficient for cutting resulting in too low sawing speeds.

Most preferred are alloys that contain an additional active metal such as chromium, titanium, vanadium, tungsten, zirconium, niobium, molybdenum, tantalum, hafnium or combinations thereof. More preferred are chromium, zirconium, vanadium or titanium of which the latter is most preferred as it has the lowest melting point. These metals are active in two ways:

They are known to improve the wetting of abrasive particles during deposition and;

It are carbide formers that work well in combination with carbon containing abrasives (see below).

Most preferred bronzes contain between 5 and 30 wt % Sn, between 0.5 and 15 wt % Ti, the remainder being copper. Best results were obtained with bronzes having between 10 and 20 wt % Sn and between 2 and 10 wt % Ti, the remainder being copper. An example is an alloy containing 14% Sn, 8% Ti the remainder being copper, all expressed in weight percentage of the total.

Possible abrasive particles are diamond, cubic boron nitride, silicon carbide, aluminium oxide, silicon nitride, tungsten carbide, titanium carbide or mixtures thereof. Carbon containing particles—diamond, silicon carbide, tungsten carbide, titanium carbide or mixtures thereof—are more preferred as they are easily wettable by all active metals mentioned. Nitrides (i.e. cubic boron nitride, silicon nitride) are best wetted with titanium. Most preferred is diamond (i.e. almost pure carbon) either man-made or natural, the former being more preferred for its lower cost.

As an alternative to adding an active metal into the metal matrix material, the active metal can also be provided on the surface of the abrasives for example in the case of diamond. Diamond particles coated with a tungsten, chromium or titanium containing coating are available.

When no active metal is present in the metal matrix material or on the abrasive particles, the abrasive particles will not wet easily to the molten metal. This even leads to 'bouncing back' of the abrasive particles on the meniscus of the molten metal pool when they are impinging the metal pool.

In general particles with a size between 100 μm and 600 μm can be used in the method. Particles for stone cutting are preferably large grit i.e. with wide range grit sizes US Mesh size 30/40, Mesh size 40/50 or Mesh size 50/60 (Mesh sizes are according to US Standard ASTME 11, the higher the numbers, the smaller the particles). Most preferred for sawing beads is mesh size 40/50. A 40 mesh sieve has square openings of 420 μm side where through smaller sized particles pass. Part of those smaller particles will be held by the 50 mesh sieve with square openings of 297 μm side. The mean size of the remaining particles is about 427 μm in the grit size designation system according FEPA (Federation of European Producers of Abrasives) that assigns a mean size for every mesh size.

The density of the abrasives is generally less than the density of the metal matrix materials that are favoured: e.g. bronzes generally have a density of 8 to 9 g/cm$^3$ while diamond only has a density of 3.5 g/cm$^3$. As the abrasive particles are relatively large and their larger buoyancy force is not hampered by viscous flow the particles will float towards the surface in the molten metal pool. When the size of the particles is smaller than about 100 μm the viscosity of the molten metal will prevent them from floating towards the surface so that the distribution of diamonds is frozen 'in place'. It is therefore a problem to have the larger abrasive particles evenly distributed throughout the bulk of the material: 'the particle distribution problem'. The inventors have solved this problem by depositing several overlapping layers on top of one another whereby the average thickness of each layer is between 0.1 to 5 times or 0.5 to 3 times or 1 to 3 times the mean size of the abrasive particles. In each track the diamond tends to float upward, but the freezing of the metal alloy is sufficiently fast that the track solidifies before the next track is deposited on top. This results in a uniform, distribution of particles in radial direction.

Bead Characterising Section

According a second aspect of the invention the bead resulting from the above described process is claimed. The bead has a tubular metallic sleeve surrounded by an abrasive layer comprising abrasive particles embedded in a metal matrix material. Characteristic about the bead is that it has a dentritic microstructure in a metallographic cross section.

Beads made by the above mentioned inventive process show a distinct metallography compared to beads obtained through the known processing of sintering. Layers deposited by means of laser cladding can show different metallographic structures depending on the metal matrix material, the temperature gradient at the liquid-solid interface and the solidification speed. For example a low solidification rate and a high temperature gradient may result in a planar structure with uniform alloying of the metal elements. Lowering the temperature gradient at the same solidification speed may result in a cellular type of structure where one phase is held in cells of another phase that has a lower melting point.

The preferred structure according the inventors for use in a sawing bead is a dentritic ('tree-like') metallographic structure that is obtained with sufficiently high but not too high cooling rates and a minimal circumferential speed. In the preferred laser cladding conditions, the components of the metal alloys in the melt pool do not get the chance to reach a thermal equilibrium. Due to the presence of a spatial high temperature gradient, the growing solid phase will seek the most effective way to eject superfluous solute components into the liquid ahead in order to meet the preferred intermetallic phase of the solid. This ejection turns out to be most effective if the solid grows in the form of a tree as then most surface is available to expel the solute. The stem and branches of the tree will therefore be formed by an intermetallic phase with a high solidification temperature while the inter-dentritic phase will be a component or intermetallic phase with a lower solidification point. By increasing the solidification speed, that is proportional to the circumferential velocity '$v_t$',—the microstructure can be refined. The fineness of the microstructure is also considered to contribute to the hardness and resistance to wear of laser clad layers: the finer the structure the higher the wear resistance. See "Laser Cladding" by E. Toyserkani, A. Khajepour and S. Corbin, Chapter 6, 2005, CRC Press, ISBN 0-8493-2172-7.

The fineness of the microstructure is specifically important for sawing beads as the metal matrix material must wear in concordance with the wear of the diamonds. Using fully alloyed or cellular type microstructural materials obtained by laser cladding will result in too soft metal matrices that are not fit for the purpose. The fineness of the structure can e.g. be quantified by measuring the largest feature of the dentritic structure such as the 'stem' of the tree in a number of frames taken from a metallographic cross section. Starting from a small magnification (10×) the largest structure is identified. The magnification is increased such that the beginning and end of the stem are visible in one frame. The stem must be uninterruptedly visible in a single view. The distance from end to end can be measured by appropriate imaging software. By preference the maximum stem length obtained on ten different frames remains below 300 µm as otherwise the structure becomes too soft. Even more preferred is that these stems are shorter than 200 or 100 µm or even shorter than 50 µm. Normally stems can be observed till a length of about 5 to 10 µm. If the maximum stem length found is below 1 µm, the structure is no longer considered dentritic for the purpose of this application.

The metal matrix material is chosen in line with the choices as specified above.

Figure 7:
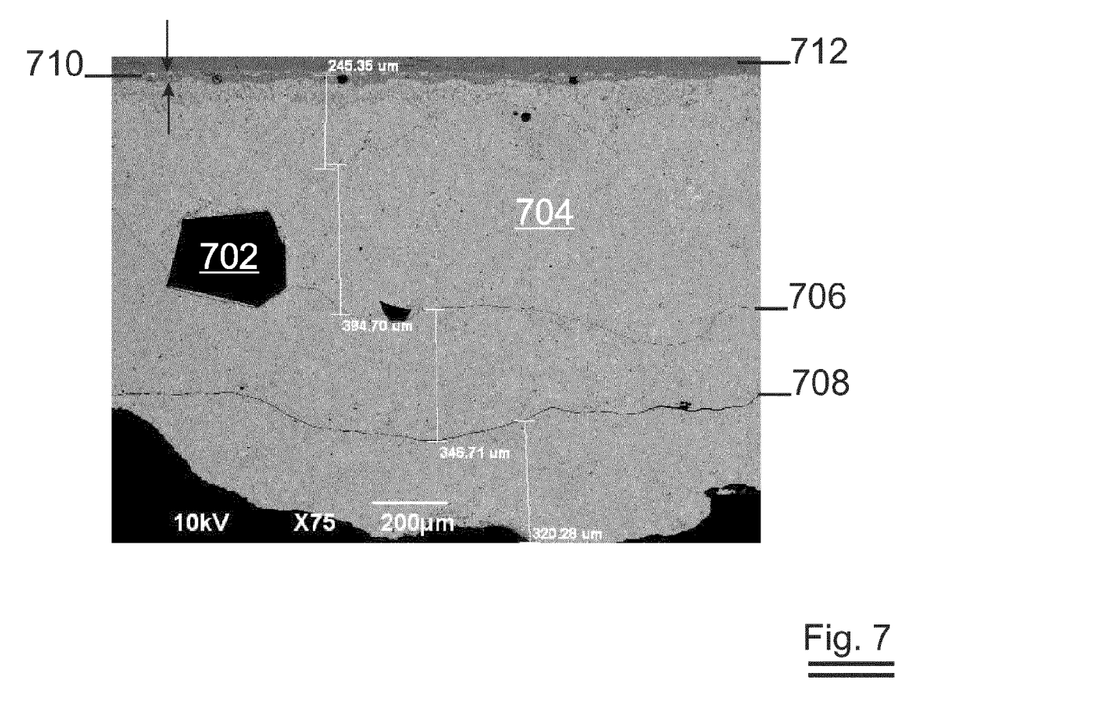
FIG. 7 shows a cross section of the abrasive layer of the bead, indicating various features of interest.

A further advantage of using the laser cladding technique is that a metallurgical bonding layer 207 forms between metal sleeve and abrasive layer. This eliminates the need to solder the abrasive layer to the tube. The inventors found that it was perfectly possible to obtain a good bond with the cladding alloys envisaged: there is no need to first clad the substrate with an adhesion layer of different composition of that of the abrasive layer. Hence the alloy that forms in the metallurgical bonding layer 207 between the tubular metallic sleeve and the abrasive layer consists only of the metal components of the sleeve and the metal components of the abrasive layer.

The adherence of the abrasive layer can be tested by shearing of the abrasive layer from the sleeve in an axial tensile test. The shear force needed to pull the abrasive layer from the sleeve when related to the surface area common between the abrasive layer and the sleeve must at least be 30 N/mm$^2$, or preferably more than 50 N/mm$^2$. Pull-off forces of 70 N/mm$^2$ or more than 100 N/mm$^2$ have been reached.

Advantageously some of the abrasive particles can—at the most—penetrate the metallurgical bonding layer. As abrasive particles are present even in close vicinity of the sleeve or even in the sleeve, this allows the beads to be used until the abrasive layer is worn almost down to the sleeve. In the prior-art beads this is not possible due to the use of a solder between sleeve and abrasive layer which takes some radial distance of the diameter of the bead.

The bonding layer can be kept very thin. By preference the bonding layer is less than half or even a third of the wall thickness of the tubular sleeve. On an absolute scale it is preferred that the bonding layer is thinner than 200 µm or 150 µm, or thinner than 100 µm although good results have been obtained with metallurgical bonding layers thinner than 50 µm like a thickness of around 20 to 10 µm. Too thin—thinner than 0.1 µm—bonding layers will lead to a reduced abrasive layer to sleeve retention force and will result in premature failure of the bead.

The preferred abrasive particles are those as described above with sizes as mentioned above. The amount of abrasive particles present in the abrasive layer depends on the material to be sawn by the bead and the type of abrasive particles. Generally an amount of 10 to 2000 mg/cm$^3$ taken relative to the volume of the abrasive layer is needed. More preferred is 10 to 1000 mg/cm$^3$. In the case of diamond this is expressed in carat as 0.05 to 10 ct/cm$^3$ (1 carat, 'ct' is 200 mg), or even 0.05 to 5.0 ct/cm$^3$. For diamond this amounts to 0.28 to 57% or 0.28 to 28% in volume of the abrasive layer.

Also mixtures of abrasive particles can be used. Particularly preferred mixtures of abrasive particles are diamond with [tungsten carbide or silicon carbide] or cubic boron nitride with [tungsten carbide or silicon nitride].

A particularly preferred embodiment of the sawing bead is one where part of the abrasive particles are protruding from the outer surface of the bead. Preferably, the particles are held in a retention layer of metal matrix material. The abrasive particles protrude between 0.5 and 0.1 times their mean size from the surrounding surface of the bead. Too much protruding particles cannot be sufficiently held by the metal matrix retention layer. When abrasive particles are buried too deep in the metal matrix material they are not readily available for sawing. The retention layer is by preference thinner than 0.5 or even more preferred thinner than 0.2 times the mean size of the abrasive particles. Too thick a layer will not disclose the abrasive particles sufficiently fast on first use. There is no minimum to the metal matrix retention layer as part of the protruding edges or corners of the abrasive particles may actually not be covered at all, while the remainder of the particle is covered. Such a sawing bead must not be dressed prior to use.

By preference the bead contains an active metal to improve the bond between the abrasive particles and the metal matrix material as discussed above.

The inventors found that this active metal also helps to improve the distribution of the diamonds throughout the beads. Indeed, metallographic cross sections (in any plane that crosses or contains the axis of the tubular metallic sleeve e.g. a plane perpendicular to the axis) revealed the presence of very thin interface layers that are rich in active metal. These interface layers are preferably thinner than 5 µm, more preferably thinner than 2 μm. With 'rich in active metal' is meant that the atomic abundance of the active metal in the interface layer is at least two times the overall atomic abundance of the active metal in the whole metal matrix material.

These interface layers mark the different loops of the track that are deposited on a previously deposited part of the track during the laser cladding process. How these interface layers are formed is not known. However, the inventors observed that the abrasive particles are more present radial just below the interface and, on many occasions, a face of the abrasive particles is wetted by the reactive metal. Hence, the abrasive particles are present between the metallic bonding layer and the first interface layer or between the first and second interface layer (if present) and so on.

It is therefore conjectured—without being bound in any way by this hypothesis—that the active metal helps to keep the abrasive particles in the molten pool and preferentially is present at the outside of the molten pool. This is not unreasonable as the active metals generally have a lower density than that of the other components of the molten metal pool. After rapid solidification, the abrasive particles are held inside the solidifying metal pool as if held by a skin. Hence the interface layers help to keep the abrasive particles in place and prevent them from floating up. In this way the 'particle distribution problem' known when depositing laser clad layers with relatively large abrasive particles is overcome. The average distance—as measured over at least 12 radii that do not cross an abrasive particle—between the metallurgical bonding layer and the first interface layer or between the interface layers themselves is preferably between 0.1 to 5 times or 0.5 to 3 or 1 to 3 times the mean size of the abrasive particles.

When, during deposition of the track, there is a relative axial movement between the laser cladding system and the tube, the track will show a substantially helical track wound on itself if the pitch after one revolution is less than the width of the track. In the bead the remnants of this process is visible in the inclination of the interface layers relative to the axis of the bead. All interface layers are inclined in substantially the same direction. The interface layers form conical helix. Of course the interfaces are not smooth, but this general inclination is present and traceable.

If abrasive particles are used that are pre-coated with an active metal coating, this active metal coating remains discernable on the abrasive particle in the bead. As these active metals show a large affinity to one or more elements of the abrasive particle (see above) this greatly improves the adhesion of the abrasive particle to the metal matrix material.

According a third aspect of the invention, a sawing cord 400 (FIG. 4) is claimed that comprises a steel cord 408 and at least one bead 404 as described above or obtained through the bead production method described above. Sawing cord 400 further comprises a polymer jacket 402 to keep the beads 404 in place. Such a cord can be produced in the conventional way or in the way as described in PCT/EP2010/067527.

When produced according to the latter method, at least one bead of the sawing cord will have a tubular metallic sleeve with the feature that at least one connection for closing the sleeve around the steel cord is present in the sleeve in addition to all other features claimed.

According a fourth aspect of the invention, use of the beads as described above and use of the beads as made according to the methods above in a sawing cord is claimed.

Figure 4:
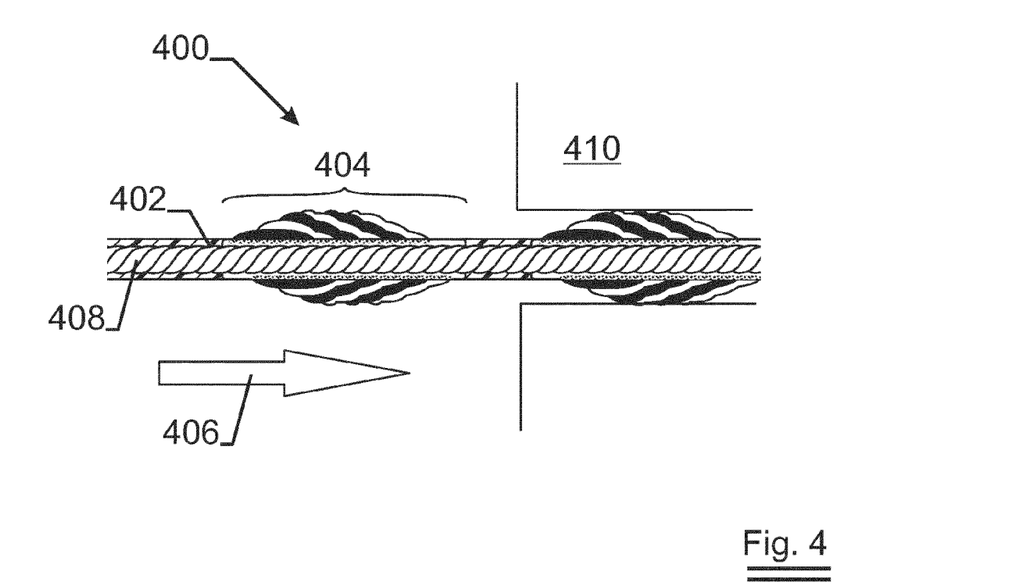
FIG. 4 explains how the bead is best used in practise.

A particularly preferred way of using the beads is when the bead 404 is, during use on the sawing cord, driven in the direction 406 as indicated by the inclination of the interface layers. Simply stated: the inclined interface layers form an arrow indicating how the bead should be used by preference. This direction is particularly preferred as the interface layers are not impacted by the entry into the work piece 410 that is sawn.

MODE(S) FOR CARRYING OUT THE INVENTION

In what follows only the most preferred mode for practising the invention will be described as numerous experiments had to be performed before these conditions were arrived at.

In a series of trials the following type of equipment was used:

Laser cladding system
  Diodelaser 'Laserline LDF 3 kW' operating at 1300 W in continuous mode at a wavelength of 1030 μm.
  Laser gun 'Balliu' made by Laserline GmbH with coaxial feed of powder;
  Medicoat Duo powder hopper
  Gas supply: argon.
Both metal matrix material and abrasive particles were fed through the same argon gas flow. The laser gun was used in the vertical position with the laser beam and associated gas flow in the downward direction.
The laser cladding system can be moved in axial direction of the lathe up to a speed of 3.2 mm/s.
The feed rate of particles was kept constant in all subsequent experiments, resulting in a constant material flux '$\phi_m$'.
As a substrate, a sleeve with a welded connection, made of low carbon steel (0.067 wt % C) with inner diameter of 3.8 mm and an outer diameter of 4.95 mm was used (wall thickness 0.575 mm), with a length of 10 mm. The substrate was held between polished brass forming pieces. Through the sleeve a 19+6×7 galvanised steel cord of diameter 3.75 mm was inserted and slowly moved through during laser cladding.
As materials the following were used:
Metal matrix material: Bronze powder with nominal composition Sn 14 wt %, Ti 8 wt %, the remainder being Cu (and unavoidable impurities). The size of the powder was smaller than 75 μm.
Man-made diamond particles mesh 40/50 with measured mean size of 415 μm.

First the lathe was started to make the sleeve rotate at about 0.25 seconds for one full rotation (rotation period 'T') which results in a track speed of 6.3 mm/s. The focus of the laser, with a spot size of 3.8 mm, was set to about 7 mm above the surface of the sleeve. The material flow was thus heated already before striking the sleeve.

The matrix material powder feed was set at 65% with a gas rate flow of 4 liter/min, the abrasive particle feed was set at 25% with a gas rate flow of 5 liter/min. After ignition of the laser a metal molten pool formed and diamond particles were injected into the molten metal as could be observed with a high speed camera. No ejection of diamond particles out of the molten metal pool occurred. The width of the track formed was 4.0 mm.

The axial movement between tube and laser gun was as follows:

| Time interval (in sec) | Relative axial speed (mm/s) | Overlap fraction Q (in %) | Number of turns |
|---|---|---|---|
| 0.00 to 1.10 | 0 | 100 | 4.4 |
| 1.10 to 1.51 | 3.2 | 80 | 1.6 |
| 1.51 to 2.55 | 2.4 | 85 | 4.2 |
| 2.55 to 2.64 | 3.2 | 80 | 0.4 |
| 2.64 to 3.64 | 0 | 100 | 4.0 |

After the stopping with the laser cladding system, the surface was evened by pushing a brass roll against the still hot material while it was turning around. This greatly improved the geometry of the bead.

After final cool-down, the chuck was opened and the thus formed bead was formed on the carrier steel cord. The heat damage to the steel cord turned out to be acceptable. The bead could still be shifted on the steel cord. Several beads were made according this procedure and it turns out to be suitable for automation.

The total thickness of the abrasive layer on the bead thus formed was 1.53 mm (i.e. 2.7 times the wall thickness of the sleeve) resulting in a bead with an outer diameter of 8.0 mm and with a total axial length of the abrasive layer of 6 mm. The total mass of the bead was 1.7 gram of which the sleeve takes 0.64 gram. As only 6 mm of the total length of 10 mm of the sleeve is covered, the 'mass of the tube covered by the abrasive layer' is 0.38 gram. The abrasive layer has a mass of 1.06 grams which is 2.79 times the mass of the tube mass covered by the abrasive sleeve. The beads had a diamond concentration of between 1.86 to 2.00 carat/cm$^3$ (mass over volume).

In a metallographic cross section, the beads obtained by laser cladding showed a distinct metallurgical structure compared to what is known from beads obtained through sintering. This structure is displayed in FIGS. 5a and 5b, which are polished cross sections of a bead cut in a plane comprising the axis of the plane. As etchant the following can be used:
- 10 ml Hydrofluoric Acid 40%, 5 ml Nitric Acid 65% in 85 ml H$_2$O and;
- 10 g Sodium Hydroxide, 5 ml Hydrogen Peroxide 30% in 100 ml H$_2$O.

Figure 5A:
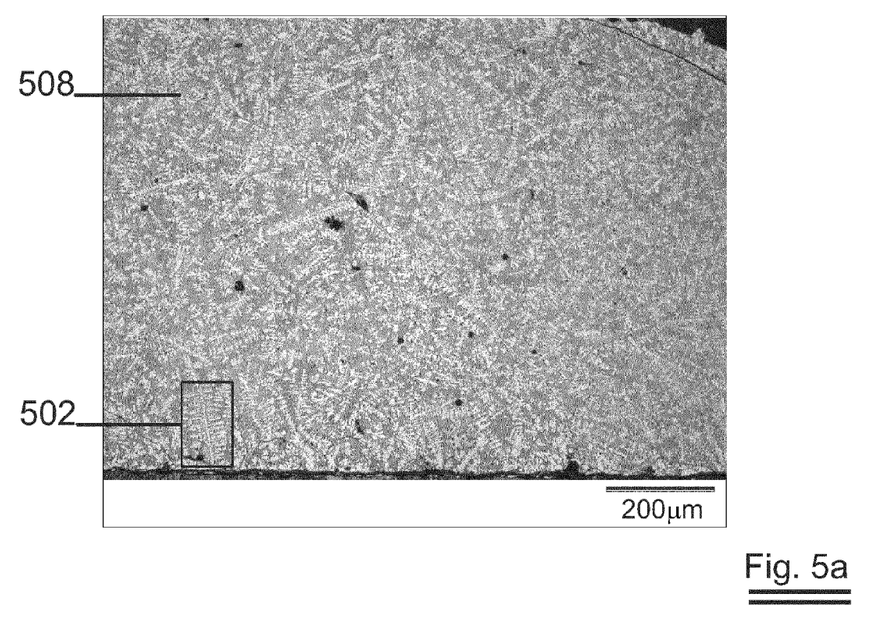
FIGS. 5a and 5b show a metallographic cross section at two different magnifications of a bead produced by the method described.

FIG. 5a shows a photograph of the etched surface with a magnification of 100×. The bar '200 µm' marks the true size of the features. The lower bottom of the photograph corresponds to the substrate. Dentritic structures are visible throughout the whole picture. An example of a dentritic structure (much like a fern) is indicated by 502. A stem is discernable with different branches perpendicular to it at the sides. The longest stem discernable is about 200 µm from end to end. In addition interface layers are visible of which 508 is an example. Another interface layer is visible at the top right corner of the photograph.

Figure 5B:
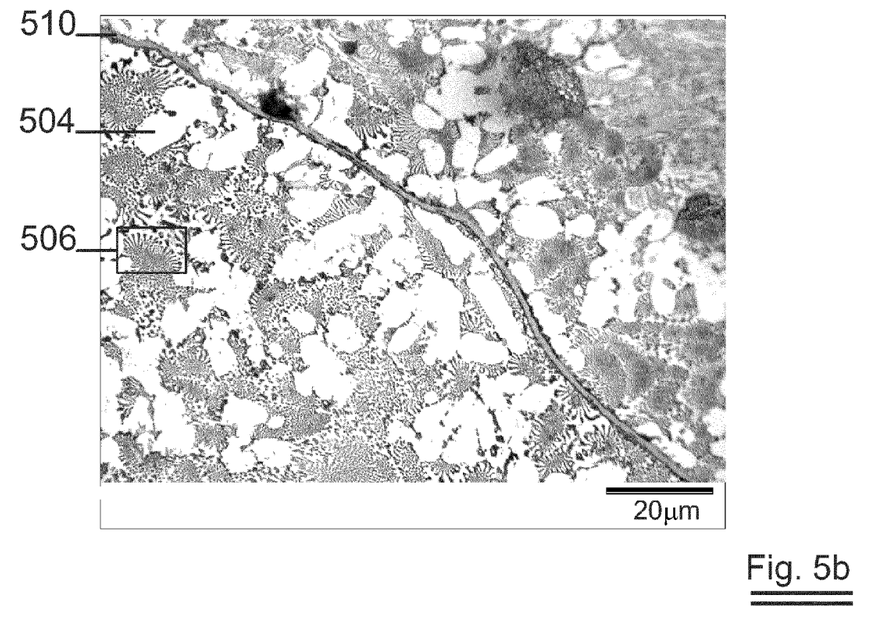

FIG. 5b is a 1000× enlargement of the same cross section as indicated by the '20 µm' bar that shows the true length of the features. Again an interface layer 510 remains visible. The tree-like structure resolves into white coloured stems, branches and leaves where in between a different, darker inter-dentritic phase is visible. The structure therefore shows a self-similar structure at at least these two magnifications.

Figure 6:
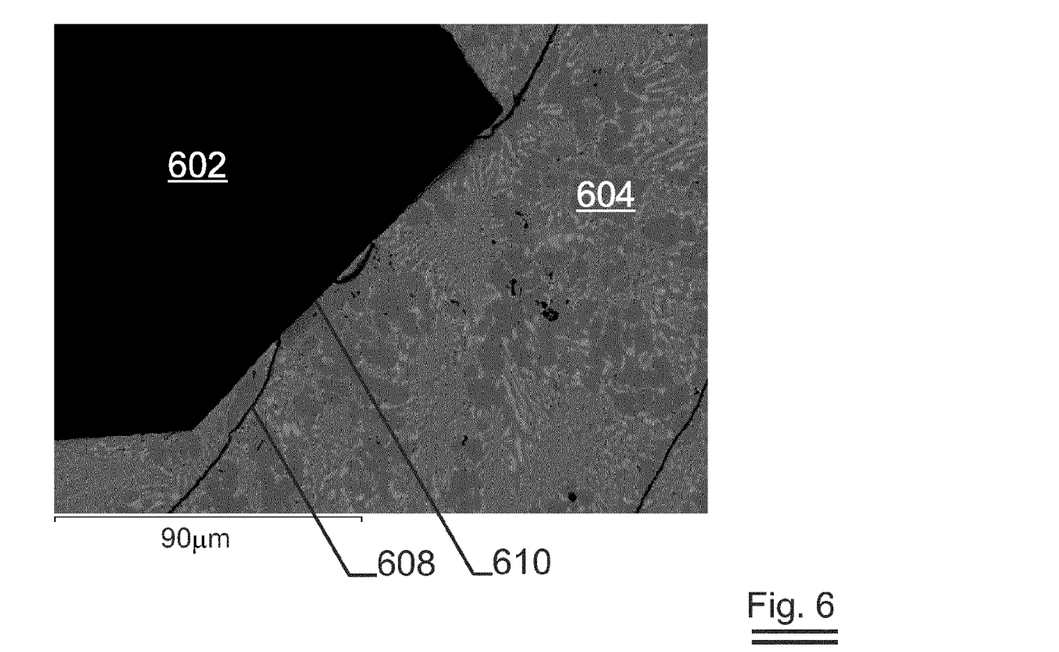
FIG. 6 shows an Scanning Electron Microscope detail of the bead produced by the method.

FIG. 6 shows a Scanning Electron Microscope (SEM) picture at the magnification indicated by the bar '90 µm'. A diamond particle 602 is clearly visible. The matrix material 604 shows again the typical dentritic structure. An interface layer 608 runs diagonally through the picture and touches the diamond surface at 610. Energy Dispersive X-ray analysis (EDX) reveals that the interface layer is rich in titanium, with more than double the bulk concentration of titanium (in weight percent). Where the interface layer touches the diamond (at 610) EDX spectra reveal the formation of titanium carbide.

FIG. 7 also shows a SEM picture of an axial cross section. Again different interface layers 706, 708 and a diamond particle 702 are discernable. It is an example of the observation that the diamond particles tend to be present radially just below the interface layers. It is as if the diamonds are held in position by the interface layer. Hence the diamonds are present in between the interface layers. The numbers 245.35, 394.70, 346.71 and 320.28 µm are the thicknesses of the different layers formed in the matrix material 704. Note that the thickness 394.70 µm of the layer is between 0.5 and 3 times the size of the diamond 702 it holds. More importantly the picture shows the metallurgical bonding layer 710 with a thickness of 20 to 30 µm. EDX reveals that the metallurgical bonding layer is a mixture of the metal elements present in the sleeve and the metal matrix material.

Axial tensile tests wherein the abrasive layer is held in a U-clamp (no radial pressure) and the sleeve is pulled out by means of a bolt showed forces of 8357 N and 10359 N before the sleeve moved out. Comparative testing on prior-art beads showed values of 5 to 12 kN. Related to the surface area common between the sleeve and the abrasive layer this is a shear force of 89 N/mm$^2$ and 110 N/mm$^2$ respectively.

Figure 8:
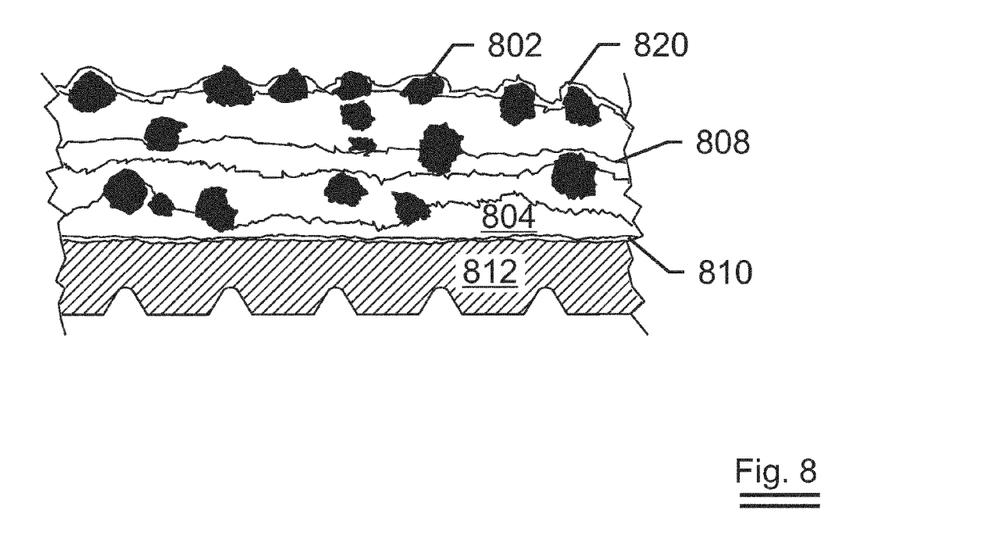
FIG. 8 is a schematic cross section of a sawing bead produced by the laser cladding method.

FIG. 8 shows a schematic cross of one of the beads made. Diamonds 802 are protruding from the surface in the immediate surroundings of the diamond. The surface protruding diamonds 802 are buried more than 0.5 times of their size into the metal matrix material taken relative to their immediate surroundings. The diamonds are partly or completely covered by a retention layer 820 of metal matrix material. The protruding diamonds make the need for a dressing step superfluous. Furthermore the metallurgical bonding layer 810 bonding the abrasive layer 804 to the sleeve 810 is indicated. Diamonds are present in between interface layers 808 and the thickness of the layers in between said interface layers is between half to two times the mean size of the diamonds.

Figure 9A:
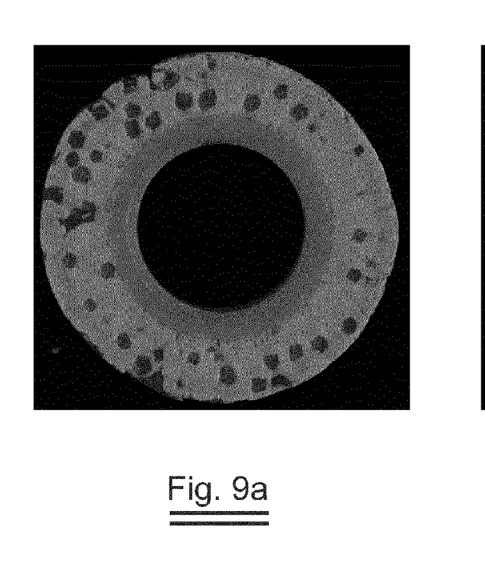
FIGS. 9a and 9b are individual pictures out of a micro computer tomography scan of the bead.

FIG. 9a shows a cross section of a bead with a plane perpendicular to the bead axis as obtained in a micro computer-tomography scan (µCT). The picture clearly reveals the geometrical roundness of the bead and the even radial distribution of the diamonds throughout the abrasive layer. This is remarkable in that, although the diamonds are about 400 to 500 micron in size, they do not appear to suffer from the buoyancy force that tends to push them to the surface. The inventors hypothetically attribute this to the layered deposition of the abrasive layer possibly in combination to the fact that the interfacial layers of active metal prevent the diamonds from floating upward thereby capturing the diamond in that layer. In this way the 'particle distribution problem' is solved.

Figure 9B:
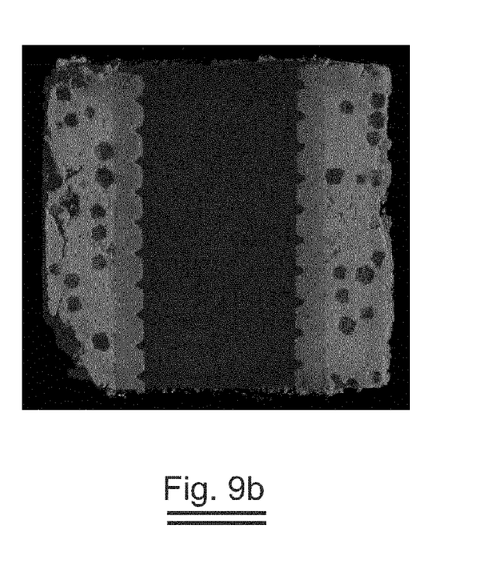

FIG. 9b is another print-out of a cross section of the bead in shows that diamonds are present down to the metallurgical bonding layer. There appears to be a tendency for the diamonds to be arranged in layers which can be attributed to the different deposition layers.

Some beads were subjected to a single bead cutting test such as described in "Progress in the knowledge of granite cutting with diamond wire" by A. Bortolussi, A. Caranassios, R. Ciccu, R. Lassandro, P. P. Manca and G. Massacci in the "Proceedings of the 11$^{th}$ International conference on Ground Control in Mining", University of Wollongong, July 1992. In this test a single bead is pushed against the outer side of a rotating stone disc (a granite disc with a diameter of 30 cm and a width of 3 cm) with a normal force of 5 N. The peripheral speed is adjustable between 20 to 30 m/s. The bead is also made to rotate around its own axis with about 1 rotation per second. Water was injected between the bead and the stone as a coolant. The wear of the bead was measured as a function of the area sawn. Sawing was continued until the bead was worn to the sleeve.

The following results were obtained in comparison with commercially available beads:

|  | Prior-art bead | Inventive bead |
| --- | --- | --- |
| Initial outer diameter (mm) | 7.1(*) | 7.1 |
| Final outer diameter (mm) | 6.6 | 6.55 |
| Surface sawn (cm$^2$) | 550 | 600 |
| Average sawing speed (mm/min) | 0.25 to 0.50 | 0.50 to 1.00 |

(*)The bead was dressed before starting the test.

The invention claimed is:

1. Method to produce a bead for use with a sawing cord comprising the steps of:
 holding a metal tube on at least one of its ends;
 starting to clad said tube by a laser cladding system whereby a supply of metal matrix material is melted by a laser beam on said tube thereby forming a pool of molten metal matrix material and;
  a supply of abrasive particles is thrown into said pool of molten metal matrix material;
 forming a track on said tube by moving said laser cladding system relative to said tube in a rotational movement, said track building an abrasive layer on said tube;
 stopping the cladding of said tube;
 allowing the thus formed bead to cool down;
 wherein said abrasive layer has a mass that is larger than the mass of a portion of said tube radially under and covered by said abrasive layer, and said relative rotational movement results in a circumferential tube speed of at least 5 mm per second.

2. The method according to claim 1, wherein said tube has a wall thickness smaller than the thickness of said abrasive layer.

3. The method according to claim 1, wherein said supply of abrasive particles and said supply of metal matrix material are such that the average thickness of the track formed is between 0.1 and 5 times the mean size of said abrasive particles, and wherein said track is spirally wound on itself with an overlap thereby resulting in subsequent layers clad on top of one another.

4. The method according to claim 1, further comprising a translational movement of said laser cladding system relative to said tube, wherein said track has a track width, and said translational movement after one full rotation being equal to or less than said track width.

5. The method according to claim 1, wherein said supply of metal matrix material is by means of carrying metal matrix material powder in a stream of carrier gas, whereby said metal matrix material powder is heated by said laser beam prior to impinging on said metal tube.

6. The method according to claim 1, wherein said step of stopping the cladding of said tube is effected by first stopping said supply of abrasive particles while continuing the supply of metal matrix material for at least one rotation of said tube after stopping said supply of abrasive particles.

7. The method according to claim 6, wherein the laser beam is off during said at least one rotation of said tube after stopping said supply of abrasive particles.

8. The method according to claim 6, wherein the laser beam is on during said at least one rotation of said tube after stopping said supply of abrasive particles.

9. The method according to claim 1, wherein said building of said abrasive layer is delimited by one or two side forming pieces held at one or two ends of said tube.

10. The method according to claim 9, further comprising the step of
 shaping the outer surface of said abrasive layer by contacting said layer with a mould after the stopping of said cladding but prior to the cooling down of said bead.

11. The method according to claim 10, wherein said mould is a rotational mould that is pushed against and rolled along said bead for at least the whole perimeter of said bead.

12. The method according to claim 10, wherein said mould and/or said side forming pieces are provided with a structured pattern, said structured pattern contacting said abrasive layer to impose the negative of said structured pattern to the sides or outer surface of said abrasive layer.

13. The method according to claim 10, wherein said mould is made of a material that reflects the light of said laser beam to limit heating of said mould.

14. The method according to claim 9, wherein said side forming pieces are made of a material that reflects the light of said laser beam to limit heating of said forming pieces.

15. The method according to claim 1, followed by the steps of:
 cutting said bead from said tube;
 axially progressing said tube by the length of one bead.

16. The method according to claim 1, wherein said tube is cooled by moving a solid and/or a fluid through it.

17. The method according to claim 16, wherein said solid is a steel cord configured to function as a carrier cord for the bead in the sawing cord.

18. The method according to claim 1, further comprising a translational movement of said laser cladding system relative to said tube.

* * * * *